United States Patent [19]

Shibata

[11] 4,246,321

[45] Jan. 20, 1981

[54] AG-SNO ALLOY COMPOSITE ELECTRICAL CONTACT

[75] Inventor: Akira Shibata, Yokohama, Japan

[73] Assignee: Chugai Denki Kogya Kabushiki-Kaisha, Tokyo, Japan

[21] Appl. No.: 972,052

[22] Filed: Dec. 20, 1978

Related U.S. Application Data

[63] Continuation of Ser. No. 807,046, Jun. 16, 1977, abandoned.

[51] Int. Cl.$^3$ .................. B32B 15/04; B32B 15/16; B32B 15/20
[52] U.S. Cl. ............................. 428/614; 428/639; 428/652; 428/673; 428/674; 428/680; 428/929; 148/31.5
[58] Field of Search ............ 428/637, 639, 652, 671, 428/673, 680, 929, 614; 148/31.5

[56] References Cited

U.S. PATENT DOCUMENTS

| | | | |
|---|---|---|---|
| 1,658,713 | 2/1928 | Fuller | 428/671 |
| 2,181,083 | 11/1939 | Payette | 428/929 |
| 2,199,240 | 4/1940 | Gwyn, Jr. | 428/929 |
| 2,222,474 | 11/1940 | Bishop | 75/170 |
| 2,425,053 | 8/1947 | Swinehart | 428/673 |
| 2,468,888 | 5/1949 | Mekelburg | 428/929 |
| 3,648,355 | 3/1972 | Shida et al. | 428/929 |
| 3,668,758 | 6/1972 | Krock et al. | 428/671 |
| 3,733,573 | 5/1973 | Dieterich | 428/671 |
| 3,775,067 | 11/1973 | Backstrom | 428/639 |
| 3,933,486 | 1/1976 | Shibata | 75/173 A |
| 4,076,560 | 2/1978 | Hoyt, Jr. et al. | 75/160 |

FOREIGN PATENT DOCUMENTS

| | | | |
|---|---|---|---|
| 2102996 | 8/1972 | Fed. Rep. of Germany | 428/673 |
| 2040463 | 1/1973 | Fed. Rep. of Germany | 428/671 |
| 2147460 | 4/1973 | Fed. Rep. of Germany | 428/929 |

*Primary Examiner*—L. Dewayne Rutledge
*Assistant Examiner*—Michael L. Lewis
*Attorney, Agent, or Firm*—Shlesinger, Fitzsimmons & Shlesinger

[57] ABSTRACT

Composite electrical contact composed of a copper base portion clad with a contact portion of Ag-SnO alloy. The contact and base portions are fusion bonded by an interfacial alloy layer of Ag and Cu and an adjacent diffusion layer of Cu as the result of heat-treatment of the contact at the eutectic temperature of Ag and Cu.

2 Claims, No Drawings

AG-SNO ALLOY COMPOSITE ELECTRICAL CONTACT

This is a continuation of application Ser. No. 807,046, filed June 16, 1977 now abandoned.

This invention relates to an electrical contact composed of a base portion made from non-precious metals such as copper and clad with Ag-SnO alloy metals as a contact portion.

More particularly, this invention relates to a novel composite electrical contact of the kind mentioned above, in which the contact and base portions are fusion bonded to each other by means of a Ag-Cu interfacial alloy layer between the said two portions, and also by means of a diffusion layer of Cu which extends deeply into the matrix of the contact portion, said two layers having been proposed by subjecting the composite electric contact for a comparatively short period of time to a temperature about or higher than the eutectic temperature of Ag and Cu, viz., 779° C. This heat treatment, which would be comparable with liquid phase sintering production of a contact, not only produces the aforementioned layers which firmly affiliate the contact and base portions, but also keeps an even dispersion of metallic oxides throughout the matrix of the contact portion of Ag-SnO. It shall be noted also that said heat treatment, which can be held after or simultaneously with binding of the base and contact portions by cold or hot press working, can release from the contact physical stresses produced in the contact by the press working.

It has been widely known to produce a clad electrical contact by clothing a base portion, such as for example a copper rivet-shape stem, with a thin plate of contact material made from silver-metallic oxides alloys, such as for example Ag-CdO alloys, by means of cold press. This clothing operation is firstly for improving physical and electrical properties of a composite electrical contact, especially its anti-welding property, by means of a Ag contact portion alloyed with metallic oxides, and secondly for minimizing the amount of expensive Ag in a contact and for increasing proportionately the amount of Cu in the contact.

The first point mentioned above as an advantage of the clothing operation is partly affirmative. However, the second point is questionable in its real merit. For example, in the case of a conventional contact of the type having a Ag-CdO contact portion and a Cu base portion mechanically bonded to each other by cold press, the contact portion often accidentally separates from the base portion when the former is only partially consumed (e.g. to only half its thickness). This occurs because the binding force between the contact and base portions relies primarily upon mechanical or physical stress to cause the metal to become plastic and to flow between the two portions, and hence the resulting bond, which has been extrinsically weakened by metallic oxides existing about the interface between the two portions and pulverized by the cold press binding process, inherently is not strong enough to stand up against the different contact conditions which occur with the consumption of the contact. Assumed that the thickness or volume of the Ag-CdO contact portion is equal to the base portion, the life of this type of composite contact is only one fourth the life of a comparative solid contact, which is made wholly from Ag-CdO alloys. Hence, it is doubtful whether the saving of a half amount of Ag-CdO or Ag can compensate for the shortening of its brief life expectancy, when considered in the light of the expensive and laborious steps and processes that are involved in manufacturing such a bimetallic composite contact.

In order to eliminate the drawbacks mentioned above, it has been tried by the present inventor to fusion bond a most conventional Ag-CdO alloy contact portion to a Cu base portion. This trial failed as no prior literature has disclosed a composite electrical contact composed of a contact portion of Ag-internal oxidized metal-and of a Cu base portion which are fusion or diffusion bonded to each other. In case of a composite electrical contact comprising a Ag-CdO contact portion, for example, such fusion bonding was found to be impossible, because cadmium oxides dispersed in the Ag matrix of the contact portion decomposed or sublimed at a temperature lower than the melting point of said Ag matrix metal, and the cadmium oxides therefore produced a segregation or barrier layer facing the inner surface of the Cu base portion, which is a detriment to a contact of this kind.

The applicant herein previously developed a specific Ag-SnO electrical contact material as disclosed in his U.S. Pat. No. 3,933,485. This specific electrical contact comprises an alloy having metal oxides precipitated therein as the result of internal oxidation, and being composed of about 5 to about 10% by weight of tin, and 1.0 to about 6% by weight of indium, the balance being silver. This alloy may contain a trace amount of less than 0.5% by weight of ferrous or alkali earth metals.

Applicant has also invented another specific Ag-SnO electrical contact material comprising an alloy having metal oxides precipitated therein as the result of internal oxidation and being composed of 1.5 to 6% by weight of tin, 0.5 to 3% by weight of indium, the total amount by weight of said tin and indium being less than 2 to 6%, a trace amount of less than 0.5% by weight of iron family element, and the balance being silver.

The inventor has now found that the Ag-SnO electrical contact materials, which he has invented as mentioned above, can advantageously be employed as a contact portion of a composite electrical contact composed of a contact portion of Ag-metal oxides, and a Cu basic portion, said two portions being fusion or diffusion bonded each to the other. This results from the findings that tin oxides of the aforementioned Ag-SnO alloys are stable in an oxygen atmosphere and at a temperature up to about 2,000° C., and sublime at the boiling point of Ag; that these metal oxides are hard enough to withstand a butt press joining without producing undesirable pulverization of said oxides but instead producing the wedging of the oxides into the Cu base portion, which results in preventing the abutting surfaces of the base and contact portions from sliding transversely to the longitudinal axes of said two portions during the butt press joining operation, and also results in mechanically strengthening the butt joint between the two portions; that a heat treatment of the portions at a temperature about the eutectic temperature of Ag and Cu, which produces the Cu diffusion into the Ag-SnO alloy matrix of the contact portion, does not adversely affect alloy structures of the base portion but works to release the two portions from stresses accompanied with the joining press work; and that the resultant bimetallic composite contact will have a useful life proportionate to the overall volume or thickness of the contact portion—i.e., will be useful until the contact portion has been substantially completely consumed.

It has been found also that among the aforementioned Ag-SnO electrical contact materials, those containing ferrous or alkali earth metals such as nickel and cobalt are most preferable as materials for the contact portion of the present invention, because such elements urge metal oxides to produce about spherical nuclei, causing the resultant Ag-SnO alloy to have a good elongation percentage, which is a prerequisite for the cold butt joining of said alloy to a Cu base portion, utilizing plastic metallic flows therebetween.

For example, the following alloys, which were made by wires of 2 mm in diameter and subjected to internal oxidation under oxidizing atmosphere at 750° C. for 24 hours, have respective elongation percentages as follows:

| Sn 1.5% - | In 0.5% - Ni 0.1% - balance Ag (elongation - 11%) |
| --- | --- |
| Sn 3% - | In 1.3% - Ni 0.1% - balance Ag (elongation - 8%) |
| Sn 4.2% - | In 1.8% - Ni 0.1% - Ag (elongation - 4%) |

Hence, it is an object of this invention to provide a composite electrical contact composed of a contact portion made from an alloy having metal oxides precipitated therein as the result of internal oxidation, and being composed of 1.5 to 10% by weight of tin, 0.5 to 6% by weight of indium, and a trace amount of less than 0.5% by weight of iron family element metals, the balance being silver, and a base portion of copper or copper alloy clad with said contact portion, said two portions having an interfacial Ag-Cu alloy layer and said contact portion having a diffusion layer of Cu adjacent to said alloy layer as the result of heat-treatment of said two portions for a short period of time and at a temperature about and higher than the eutectic temperature of Ag and Cu.

EXAMPLE 1

A composite electrical contact of the rivet type (Sample A) was prepared from a contact portion of 5 mm diameter and 0.5 mm. thickness made from a Ag-SnO alloy of Sn 5%-In 1.8%-Ni 0.3%-Ag, and a copper base portion having a base part of 5 mm diameter and 1.0 mm thickness and an integral shank part of 2.5 mm diameter and 2.5 mm length by cladding the base with the contact portion by cold press butt joining. This Sample A was heated at 800° C. for 10 seconds at atmospheric conditions. The Sample A thus heat-treated was cut and etched, and observed by an electron microscope at a magnification of ×2800. There were observed an interfacial alloy layer of Ag-Cu of about 7/u thickness around the boundary of the base and contact portions (and immediately adjacent the copper base), and a thicker diffusion layer of Cu into the contact portion at a depth of about 51/u adjacent to the aforementioned Ag-Cu alloy layer, and at the side thereof remote from the Cu base or matrix. It was also observed that the alloy structure of the contact portion, especially its metal oxides and the even distribution thereof, were not adversely affected by said Cu diffusion.

Sample B, having a construction similar to the Sample A but utilizing Ag-CdO 13%, was prepared without the above-noted heat-treatment.

Both samples A and B were subjected to switching tests of 50,000 cycles (AC 200 V, 75 A, for 0.6 second with a switching cycle of 3 seconds). Average loss of weight in Sample A was 20.66 mg., while in Sample B 29.52 mg. Noticeable part of the contact portion of Sample B was broken off.

EXAMPLE 2

Sample A of Example 1, Sample C of dimensional structures same to the Sample A, but made wholly from Ag-CdO 13%, and a sample D of dimensions same as Sample A but made wholly (i.e. both contact and base portions) from Ag-SnO alloy of Sn 5%-In 1.8%-Ni 0.3%-Ag, were tested for 2000 cycles under AC 200 V, 32 A, 60 cycles per minute, contact force of 100 g. and opening force of 80 g. Average hardness (HRF) of these three Samples when measured vertically from contact surfaces were 80 (Sample A), 107 (Sample C), and 110 (Sample D).

Times of welding and average force (g) are as follows.

| Sample A | 19 times | 117g |
| --- | --- | --- |
| Sample C | 21 times | 138g |
| Sample D | 4 times | 228g |

Contact resistances (mΩ) of the samples are as follows:

| At 1000 cycles - | |
| --- | --- |
| Sample A | 2.7 mΩ |
| Sample C | 3.0 mΩ |
| Sample D | 3.2 mΩ |
| At 1500 cycles - | |
| Sample A | 1.9 mΩ |
| Sample C | 3.8 mΩ |
| Sample D | 5.3 mΩ |
| At 2000 cycles - | |
| Sample A | 3.7 mΩ |
| Sample C | 4.3 mΩ |
| Sample D | 4.5 mΩ |

Thus low contact resistance and good thermal dissipation were observed in Sample A.

In the present invention instead of Cu and its alloy, Al and Ni and their alloys can be employed also as a base portion. The heat-treatment of the contact for producing a fusion binding therein can, of course, be made simultaneously with a cold forging operation of the contact, for example by providing heat to cold forging dies.

What is claimed is:

1. A heat-treated composite electrical contact consisting of a base portion and a contact portion clad to said base portion, said base portion being made from a metal selected from the group consisting of copper, nickel, aluminum and alloys thereof, said contact portion consisting essentially of a pre-internally oxidized alloy having metal oxides precipitated in and evenly dispersed throughout the matrix of said alloy as the result of internal oxidation effected prior to the cladding of said contact portion to said base portion, and being composed of 1.5 to 10% weight of tin, 0.5 to 6% by weight of Indium and a trace amount of less than 0.5% by weight of iron family element metals, the balance being silver, said contact and base portions being joined by an interfacial alloy layer composed solely of materials from said base and said contact portions, and comprising, respectively, silver from said contact portion, and the matrix metal of said base portion, and consisting essentially of metal oxides from the contact portion wedged into the base portion which prevent abutting surfaces of the base and contact portions from sliding; and said contact portion, adjacent the side of said interfacial alloy layer remote from said base portion being diffused by the metal of the base portion to a depth beyond said interfacial alloy layer as the result of heat treatment of the contact for a brief period of time, and at a temperature about or higher than the eutectic temperature of silver and the matrix metal of said base portion.

2. A heat-treated contact as claimed in claim 1, wherein said base portion is made from copper and said contact portion is subjected to a temperature hgher than 779° C. for a period of less than 10 seconds.

* * * * *